Jan. 7, 1958 D. F. J. DI PASCUALE ET AL 2,818,923
MACHINE FOR MANUFACTURING GRIDS
Filed May 11, 1954 4 Sheets-Sheet 1
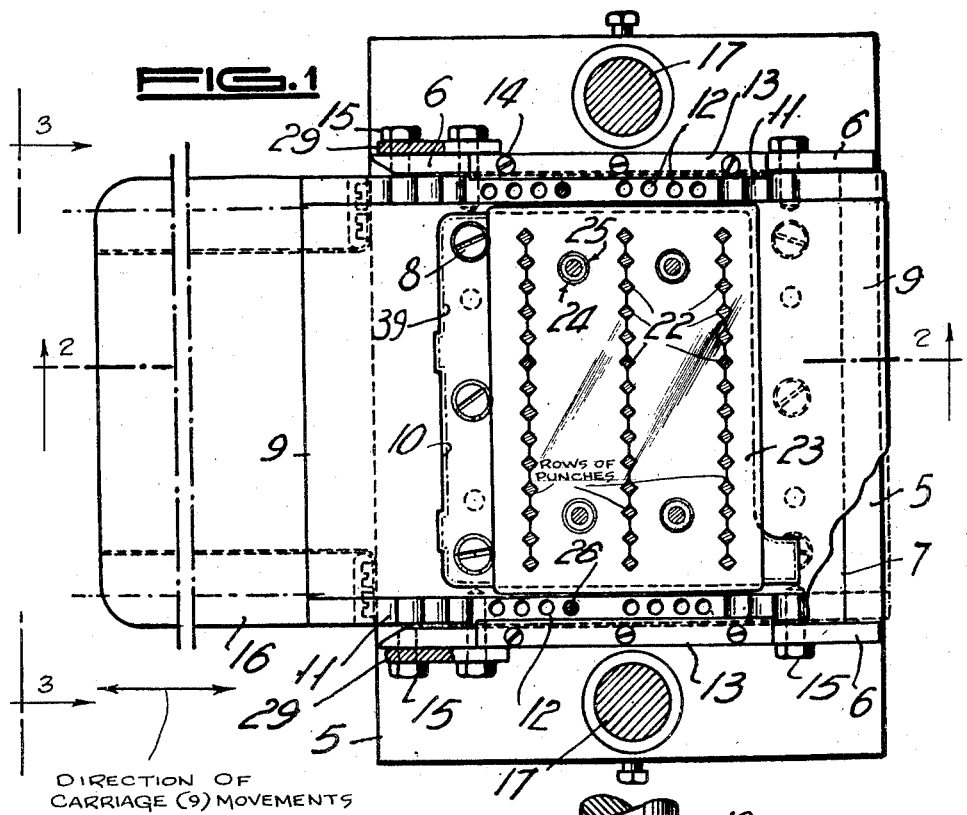
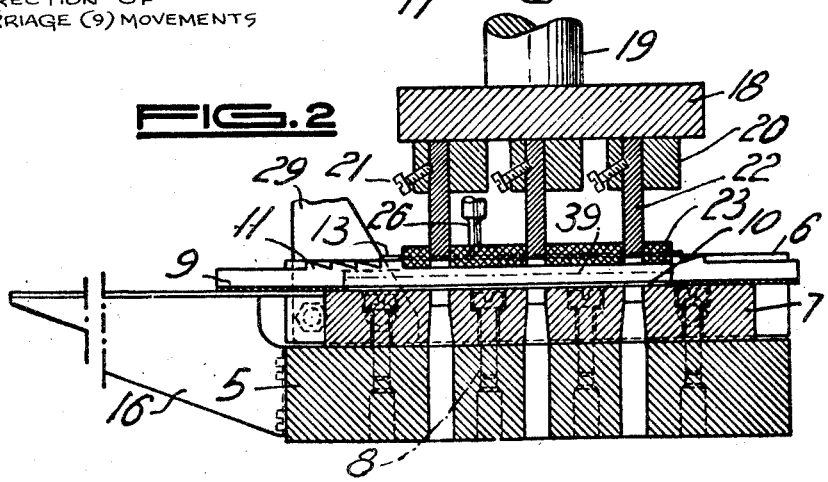
INVENTORS:
Diego F. J. Di Pascuale,
Enrique Durandi,
Raul Enestrom,
BY
Freeman & Marmorek
Their Agents.

Jan. 7, 1958 D. F. J. DI PASCUALE ET AL 2,818,923
MACHINE FOR MANUFACTURING GRIDS
Filed May 11, 1954 4 Sheets-Sheet 2
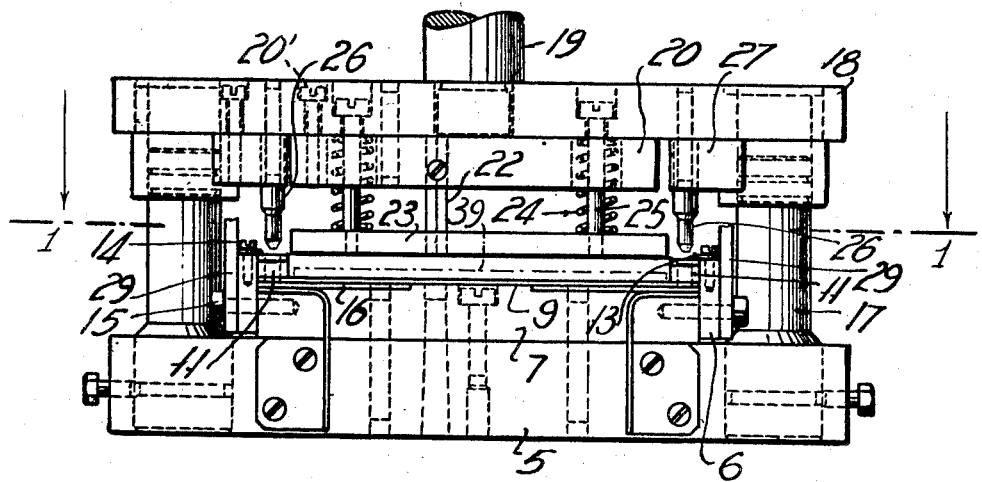
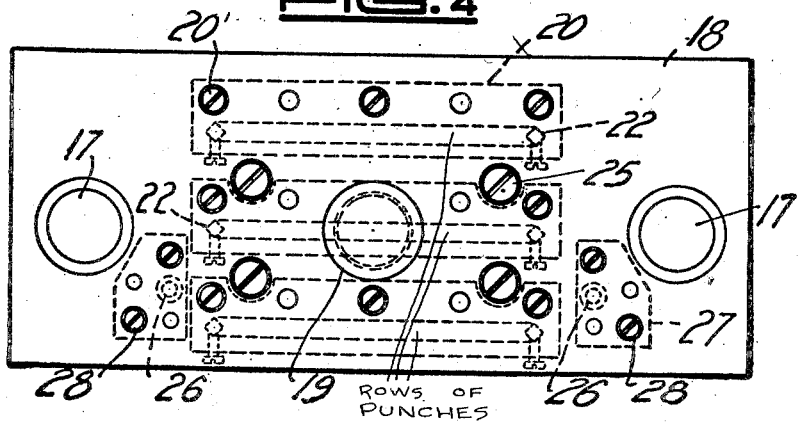
ROWS OF PUNCHES
DIRECTION OF
CARRIAGE (9) MOVEMENTS
INVENTORS:
Diego F. J. Di Pascuale,
BY Enrique Dinardi,
and Raul Enstrom,
Freeman & Marmorek,
Their Agents.

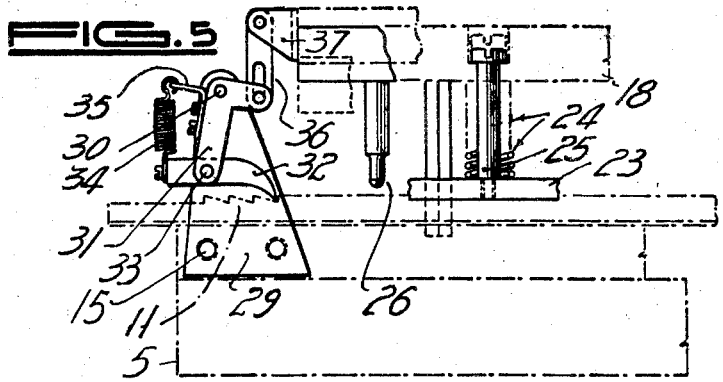
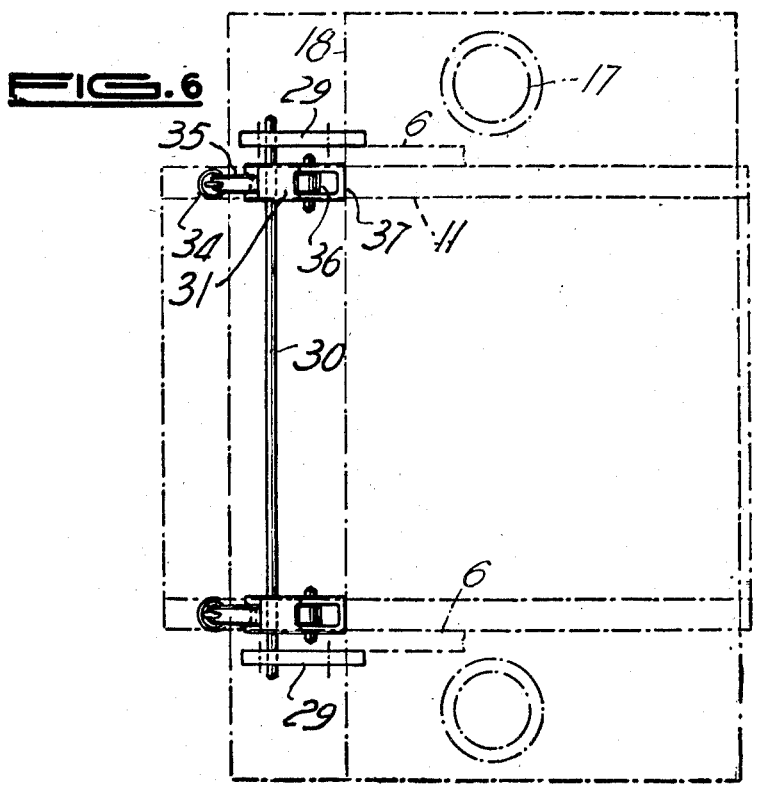

Jan. 7, 1958   D. F. J. DI PASCUALE ET AL   2,818,923
MACHINE FOR MANUFACTURING GRIDS
Filed May 11, 1954   4 Sheets-Sheet 4
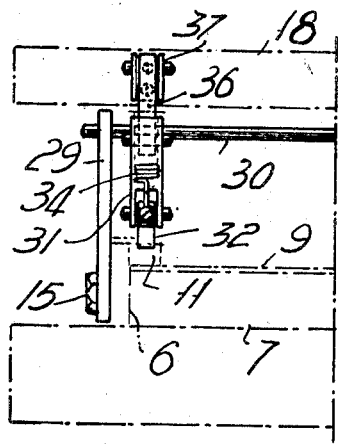
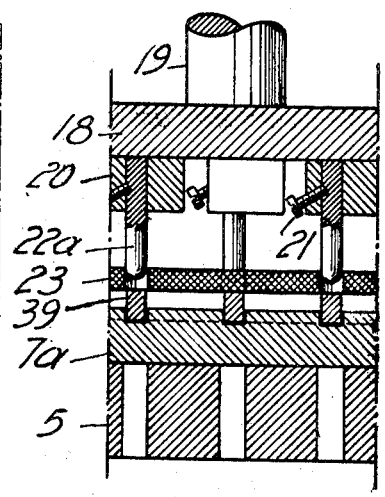
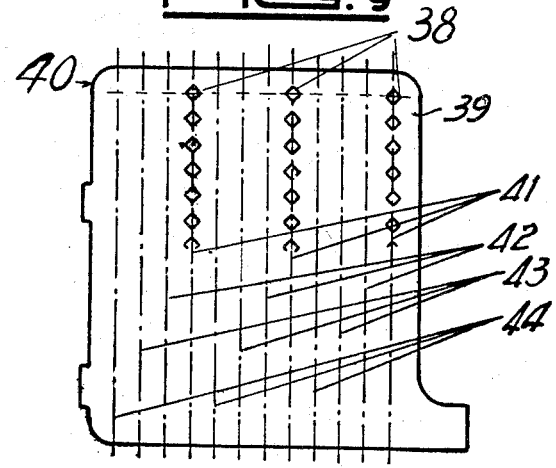

United States Patent Office 2,818,923
Patented Jan. 7, 1958

2,818,923

MACHINE FOR MANUFACTURING GRIDS

Diego Felipe Juan Di Pascuale, Enrique Dinardi, and Raul Eneström, Cordoba, Argentina Application May 11, 1954, Serial No. 429,049

1 Claim. (Cl. 164—87)

The invention relates to a machine for manufacturing grids for different uses, such as those destined for electric accumulator plates, for covering drain and ventilation inlets or openings, or the like, having as its starting material thin and plain sheets.

The machine has been designed for transforming mechanically a sheet of metal or other material into a perfect grid without the complications an inconveniences of casting or moulding. The grid is obtained by means of a series of perforations which are effected simultaneously in the sheet, skipping or alternating each time for example three rows so as to avoid particularly deformations of the sheet and besides lightening the effort of the machine.

The machine includes the combination of a perforating die device and a carriage for advancing wherein the sheet to be transformed into a grid will be placed so as to be advanced by the carriage intermittently and synchronously with the dies, the perforations being effected in skipped rows until termination of the entire series.

The machine will be mounted in a balance beam and the elements which compose it are dismountable, not only for the purpose of replacing and arranging them, but also for enabling to use the machine with the help of certain accessories for effecting works which precede and succeed the perforation of the sheets, such as for example: the structural shape or perimetric trimming of the sheets; the stamping for printing trademarks or any other sign or legend; the depression or sinking of certain parts of the sheet, after having been transformed into a grid, apt to alter the surface smoothness thereof by deplacing the material towards the openings or passages of the grid, due to crushings. By the same effect there may be obtained upon the surface of the sheet any design or engraving in accordance with the dies or tools which will be used and the pressure which will be exerted for the compression of the material.

Other constructive particularities which characterize the machine will be perceived from the description which follows.

For better comprehension of the invention and so as to perform it easily, it has been shown by way of example in one of its preferred forms of construction by means of various illustrative figures wherein:

Figure 1 is a plan view, partly in section, taken along the line 1—1 of Figure 3.

Figure 2 is a sectional view, taken on line 2—2 of Figure 1.

Figure 3 is a front elevational view, but without the pawl mechanism for advancing the carriage so as to make the drawing clearer, as seen in direction 3—3 of Fig. 1.

Figure 4 is a plan view of the head piece of the machine upon which a (not shown) balance beam will operate.

Figure 5 is a schematic side elevational view of the pawl mechanism for the carriage and which promotes the advance of this latter one.

Figure 6 is a plan view of the same pawl mechanism.

Figure 7 is a fragmentary front elevational schematic view of said pawl mechanism.

Figure 8 is a sectional view similar to Figure 2, but embodying a modification using different dies.

Figure 9 is a horizontal elevational view of the sheet or plate upon which lines indicate the axis of the perforations which the machine effects during the successive acts of transforming the sheet into a grid.

In the different figures of the design the same reference numbers indicate the same or corresponding parts which are visible.

The machine consists in a base 5 (Figures 1, 2 and 3) provided at the sides with guides 6 and between them at the upper part is to be seen a lower die 7 fixed by means of screws 8 in such a way that the heads of said screws will be embedded therein.

Between said guides 6 there is playing carriage 9 the principal body of which consists of a plate shaped as a frame, having an opening 10 (Figures 1 and 2) wherein will be lodged the sheet or plate which is to be converted into a grid, as will be seen later on.

On the other hand carriage 9 has at the sides solidarily therewith bars 11 which are towards one and the other extreme thereof symmetrically toothed so as to give to carriage 9 a reversible character. The central parts of said bars 11 which are free are provided with spacing orifices 12 in two groups of for example four orifices for each bar 11, said orifices 12 of each group being spaced from one another at equal distances as regards the steps which carriage 9 has to advance during its intermittent sliding play, as will be seen later on.

So as to prevent any raising of carriage 9, the guides 6 are provided with plates 13 fixed by means of screws 14. Said plates 13 project inwardly and above toothed bars 11 (Figures 1, 2 and 3).

Base 5 of the machine has furthermore at the sides thereof the following elements: screws 15 which fasten said guides 6; at the front base 5 has bracket 16 which is flush with die 7; and at the upper part and sidewards columns 17 will be found.

At a higher level than base 5 and guided by said columns 17 head piece 18 (Figures 2, 3 and 4) is to be seen. It consists of a plate apt to be united to rod 19 which belongs to a (not shown) balance beam or a similar device which is able to produce mechanically a determined downward pressure. Against the inferior surface of said head piece 18 tool carriers 20 are attached by means of screws 20' (Figures 3 and 4) and with the help of other screws 21 punches 22 are for their part fixed to said tool carriers 20, this assembly forming the counterdie or upper die of the machine.

Beneath head piece 18 there exists furthermore press 23 which preferably consists of a plate through which said punches 22 pass freely. Said press 23 is separated from head piece 18 by means of springs 24 and retained in suspension by pins 25 so that said press may effect elastically a certain movement of approximation towards said head piece 18 as far as allowed by said springs 24. The described detail may also be seen in Figure 5. Press 23 occupies in the machine a width which is equal to the free space comprised between the two bars 11 of carriage 9 or at least thus that it can pass freely through said space, as will be seen in Figures 1 and 3. Thus it may act, as will be explained later on, upon the sheet to be worked which will be put into cavity 10 of carriage 9 for the purpose of maintaining it pressed and avoiding a deformation thereof at the moment of operating punches 22.

Beneath head piece 18 there exist stops 26 disposed at both sides and directed upon the lines occupied by orifices 12 of bars 11 so as to be apt to enter in the fashion of pegs or bolts into said corresponding orifices whenever head piece 18 descends, carriage 9 being thus successively and opportunely maintained motionless and at determined sites during the work of the machine. Said stops 26 are held at head piece 18 by means of supports 27 which for their part are fixed by screws 28 (Figures 3, 4 and 5).

The mechanism for advancing carriage 9 is composed of supports 29 a part of which may be seen in Figures 1 and 3 and a detail thereof in Figures 5, 6 and 7. They are disposed at both sides of the machine and upon guides 6, the same screws 15 which fix said guides 6 to the body of die 7 being also used for adhering them. Therebetween shaft 30 is mounted against which angular levers 31 bear at the respective sides of the machine. Each one of said levers has at one of the extremes thereof pawl 32 articulated by means of small shaft 33 and provided at the rear end thereof with spring 34 fixed to angle iron 35 in such a way that said spring 34 tends to maintain the pawl 32 engaged upon the corresponding toothed bar 11 of carriage 9. The other extreme of angular lever 31 is united by means of link 36 to support 37 articulately, the last one of said elements being fixed to head piece 18 of the machine.

The machine of this construction will be adapted to the platform or work table of a balance beam or the like, head piece 18 being fixed to rod or stem 19 thereof so as to be apt to effect an alternative rectilinear descending and ascending movement whenever operated from the handling or command spot, at the opportune moments.

The operation is as follows:

As principal function the machine will have to effect, as partially shown in Figure 9, various series of holes 38 in a sheet 39 for converting it into a grid. Said sheet 39 will be trimmed following a determined profile or outline 40 (as for example the case of that of a plate for electric accumulators), and it may be mentioned that cavity 10 of carriage 9 (Figure 1) will have a similar shape, as said sheet will be lodged in said cavity.

Therefore sheet 39 being put into carriage 9 and this latter one being at its initial position, what will occur when pawl 32 is put into the first posterior tooth of bar 11 (Figure 5), head piece 18 will be caused to descend, which will produce the following effects: at first stops 26 will enter into corresponding orifices 12 (the first one of the group upon one and the other of bars 11) so as maintain stationary and at the correct place carriage 9; then press 23 will subject sheet 39 against the lower die 7 so as to avoid any deformation and maintain it furthermore motionless in cavity 10 of carriage 9; and finally punches 22 which may be disposed in three rows in accordance with the illustrated example will effect the first series of holes 38 along the three lines 41 (Figure 9) of the corresponding sheet 39. It must also be mentioned that furthermore the descending movement of head piece 18 will cause the simultaneous backward motion of each one of pawls 32 (Figures 5, 6 and 7) due to the movement transmitted through corresponding link 36 to angular lever 31, as this will be obliged to turn a fraction of a revolution, carrying said pawl 32 towards behind so as to put it into the following tooth of bar 11.

After effecting this first series of holes 38, head piece 18 will ascend, originating now an inverse movement to each one of angular levers 31 and thereby to the corresponding pawl 32, as an effect of which carriage 9 will be caused to advance a stretch which is equal to the step or the distance which will exist, between any two successive lines, such as the lines 42 and 41 after termination of the entire perforation of sheet 39 between one and the other row of holes 38 which will be made by the machine upon lines 41, 42, 43 and 44 (Figure 9).

Therefore, when carriage 9 advanced this stretch, it will place sheet 39 which it dragged along with it in such a position that the three following lines thereof 42 will remain correspondingly beneath punches 22 so as to effect upon them, when head piece 18 again descends, the second series of holes in the same fashion as the first preceding series; and thus successively, during the following advances of carriage 9 and the strokes or descents of head piece 18, the machine will perforate upon the adjacent lines 43 and 44 the other series of holes which remain, sheet 39 being then completely perforated and therefore converted into a grid.

Press 23 will also perform the functions of avoiding that, when punches 22 ascend after the perforations, they will drag with them frictionally sheet 39.

As has been seen, the series of perforations are effected with three skipped rows at a time, starting from different spots of the sheet so as to effect afterwards orderly and in the same number the remaining series until terminating with all of them. In this way it is possible to make the work uniform, distributing the pressures at different spots and avoiding a deformation of the sheet, particularly if the material of which it consists is very malleable or relatively soft. To all this the advantages and results already stated at the beginning of this specification must be added.

The machine is in condition to perform, after manufacturing the grid, still other work upon it which will consist in a crushing or stamping at different points thereof. For this purpose it will be sufficient to place a die 7a (Figure 8) upon base 5 which will serve as a seat or support for sheet 39 and replace the used perforating punches by pressing punches 22a in tool carrier 20. In the same fashion in which the machine has been effecting perforations, it will now effect convenient compressions upon the material for whichever purpose, for example so as to alter the smoothness, to flange the orifices and to round their edges through the exercised crushing; impress figures or legends upon the surface etc.

The possibility of replacing the tool carriers 20 will enable to effect said operations, as well in the sense in which the corresponding tools have to be put, as with regard to the distances to be observed between one another, in accordance with the dimensions of the sheet to be worked, type of mesh or perforations to be given, outline thereof, etc.

We claim:

In a punch, in combination, a support including a lower die and having an upper surface for supporting material to be punched, a carriage movable on said support and having formed therein a cut-out having an outline and contour matching that of the particular material to be punched and designed to receive said material so that the material when emplaced in said cut-out of said carriage and on said surface of said lower die will be moved along with the carriage, an upper die vertically reciprocable for cooperating at each stroke with predetermined parts of said lower die, a plate resiliently suspended from said upper die and normally disposed below the lower end of said upper die and operable to engage the material in advance of the upper die during the downward stroke of the upper die to restrain any movement and wrinkling thereof, means operable for feeding said carriage during each upward stroke of the upper die, whereby said carriage will present different parts of the material to the dies between successive strokes of the upper die, and means operable on both lateral sides of said carriage for registering the carriage in position for upper and lower die cooperation immediately before the completion of each downward stroke of the upper die.

References Cited in the file of this patent
UNITED STATES PATENTS

| | | |
|---|---|---|
| 11,222 | Hague | July 4, 1854 |
| 260,381 | Foglesong | July 4, 1882 |
| 456,579 | Long | July 28, 1891 |
| 524,203 | Henderson | Aug. 7, 1894 |
| 793,051 | Chapman | June 27, 1905 |
| 951,169 | Worton | Mar. 8, 1910 |
| 1,145,167 | Schmidt | July 6, 1915 |
| 1,856,970 | Siegrist | May 3, 1932 |
| 2,051,031 | Dilks | Aug. 18, 1936 |
| 2,556,010 | Swanson | June 5, 1951 |
| 2,580,756 | Furman | Jan. 1, 1952 |
| 2,684,717 | Jones et al. | July 27, 1954 |